United States Patent [19]
Sugawara

[11] Patent Number: 5,356,091
[45] Date of Patent: Oct. 18, 1994

[54] SPINNING REEL

[75] Inventor: Kenichi Sugawara, Sakai, Japan

[73] Assignee: Shimano Inc., Osaka, Japan

[21] Appl. No.: 685,672

[22] Filed: Apr. 16, 1991

[30] Foreign Application Priority Data

May 9, 1990 [JP] Japan .............................. 2-48428[U]
Jun. 6, 1990 [JP] Japan .............................. 2-60399[U]

[51] Int. Cl.$^5$ .............................................. A01K 89/00
[52] U.S. Cl. ...................................................... 242/319
[58] Field of Search ................................ 242/230–233, 242/319

[56] References Cited

U.S. PATENT DOCUMENTS

| | | | |
|---|---|---|---|
| 2,884,211 | 4/1959 | Holahan, Jr. ................. | 242/319 |
| 4,451,012 | 5/1984 | Puryear et al. ................ | 242/319 |
| 4,561,604 | 12/1985 | Matsushima ................ | 242/230 X |
| 4,778,124 | 10/1988 | Shinohara ................... | 242/230 |
| 4,834,311 | 5/1989 | Kaneko ....................... | 242/319 |

FOREIGN PATENT DOCUMENTS

63-55870  4/1988  Japan .

Primary Examiner—Daniel P. Stodola
Assistant Examiner—Michael R. Mansen
Attorney, Agent, or Firm—Dickstein, Shapiro & Morin

[57] ABSTRACT

A spinning reel has a rotary frame, a spool reciprocable along an axis of the rotary frame with rotation of the rotary frame and a line-retainer mechanism for preventing fall of a fishing line off a line-accommodating portion of the spool or for preventing movement of fallen line towards the rotary frame axis. The line-retainer mechanism includes a spool engaging unit engageable with an engaging portion of the spool so as to reciprocate with the spool and to rotate relative to the spool and a rotary frame engaging unit engageable with an engaging portion of the rotary frame so as to rotate with the rotary frame and to axially reciprocate relative to the rotary frame. The spool engaging unit includes a roller member engageable with the engaging portion of the spool and rotatable therewith.

7 Claims, 7 Drawing Sheets

SPINNING REEL

BACKGROUND OF THE INVENTION

1. Field of the Invention

The present invention relates to a spinning reel, and more particularly to a spinning reel comprising a rotary frame including a bail arm, a spool reciprocable along an axis of the rotary frame with rotation of the frame and a line-retainer member for preventing a fishing line from falling off a line accommodating portion of the spool or for preventing the fallen line from moving towards the axis of the rotary frame.

2. Description of the Related Art

With a spinning reel of the above-described type, the fishing line once wound about the spool may become loose and extend radially due to the elasticity of the line per se; and this loosened line may fall off the line-accommodating portion of the spool. This fallen line will move along a base end of the rotary frame and the entire region of the rotational axis of the frame. Consequently, the line will become entangled with a support shaft positioned at the axis or other parts positioned adjacent thereto and this entanglement may result in breakage of the line. In particular, this trouble tends to occur oftentimes when there is a decrease in the winding-up speed of the line or when a rear end wall (skirt portion) of the spool has a reduced longitudinal width for the purpose of compactness of the entire reel.

The prior art has suggested use of the line retainer member for preventing the falling of the line off the line-accomodating portion of the spool. One such convention is known from a Japanese laid-open utility model gazette No. 63-55870 corresponding to U.S. Pat. No. 4,778,124. This reference invention has the following features.

(1) A support arm of the rotary frame supporting a bail arm supports a support shaft along the reciprocating direction of the spool.

(2) The support shaft loosely mounts a roller member rotatable about and movable along the axis of the support shaft.

(3) A rear end wall of the line-accommodating portion of the spool defines an engaging groove engageable with the roller member to allow the rotary member to reciprocate together with the spool and also for allowing rotation of the rotary frame relative to the spool.

(4) The above-described support shaft and the roller member together constitute a line retainer means.

Accordingly, the roller member functions to receive the line if and when the line has fallen off the line-accommodating portion, thereby preventing the line from entering the axis region of the rotary frame along its base end.

However, for causing the roller member to rotate smoothly to move along the axis of the support shaft, a diameter of an insertion hole of the roller member and an outer diameter of the support shaft through its entire length must match with very high precision. Further, even with very precise matching between these dimensions, if the reel, like the above-described convention reel, employs a double-bearing construction for supporting the support shaft, the support shaft has different resistance against flexion at its intermediate portion and end portions, such that the intermediate portion having less resistance tends to flex through extended use of the reel. One obvious method to avoid this is to increase the outer diameter of the support shaft. However, since the support shaft is disposed within the limited space between the bail arm support arm and the spool, there is a limit to increasing the diameter.

The primary object of the present invention is to provide a spinning reel with an improved line-retainer means employing a new engaging arrangement for the rotary frame and the reciprocable spool, the improvement assuring both smooth rotation of the rotary frame and smooth reciprocating action of the spool.

SUMMARY OF THE INVENTION

For accomplishing the above-described object, a spinning reel, according to the present invention, comprises: a rotary frame; and a spool reciprocable along an axis of the rotary frame with rotation of the rotary frame; a line-retainer means for preventing a fishing line from falling off a line-accommodating portion of the spool or for preventing movement of a fallen line towards the rotary frame axis. The line-retainer means includes a spool engaging unit engageable with an engaging portion of the spool so as to reciprocate with the spool and to rotate relative to the spool and a rotary frame engaging unit engageable with an engaging portion of the rotary frame so as to rotate with the rotary frame and to axially reciprocate relative to the rotary frame. The spool engaging unit includes a roller member engageable with said engaging portion of spool and rotatable therewith.

Functions and effects of the above-described construction will be described.

The engagement between the spool engaging unit of the retainer means and the engaging portion of the spool and the engagement between the rotary frame engaging unit of the retainer means and the engaging portion of the rotary frame together function to close the gap between the spool and the rotary frame, thus reliably preventing the intrusion of fallen line into the region of the rotary axis.

Moreover, according to the invention's construction, the roller member rotatable relative to the spool is provided to the line-retainer means rather than to the rotary frame, the latter of which is the convention. Therefore, this roller member of the invention can be very simple with the sole requirement of the relative rotation to the spool; while, that of a convention reel must effect both the relative rotation and the smooth axial reciprocation in relation with the spool.

As discussed above, the invention has fully achieved its intended object of providing a spinning reel with an improved line-retainer means employing a new engaging arrangement for the rotary frame and the reciprocable spool, the improvement assuring both smooth rotation of the rotary frame and smooth reciprocating action of the spool.

Further and other objects, features and effects of the invention will become more apparent from the following more detailed description of the embodiments of the invention with reference to the accompanying drawings.

BRIEF DESCRIPTION OF THE DRAWINGS

Accompanying drawings illustrate preferred embodiments of a spinning reel relating to the present invention; in which.

DESCRIPTION OF THE PREFERRED EMBODIMENTS

Preferred embodiments of a spinning reel relating to the present invention will now be described in detail with reference to the accompanying drawings.

Figure 1:
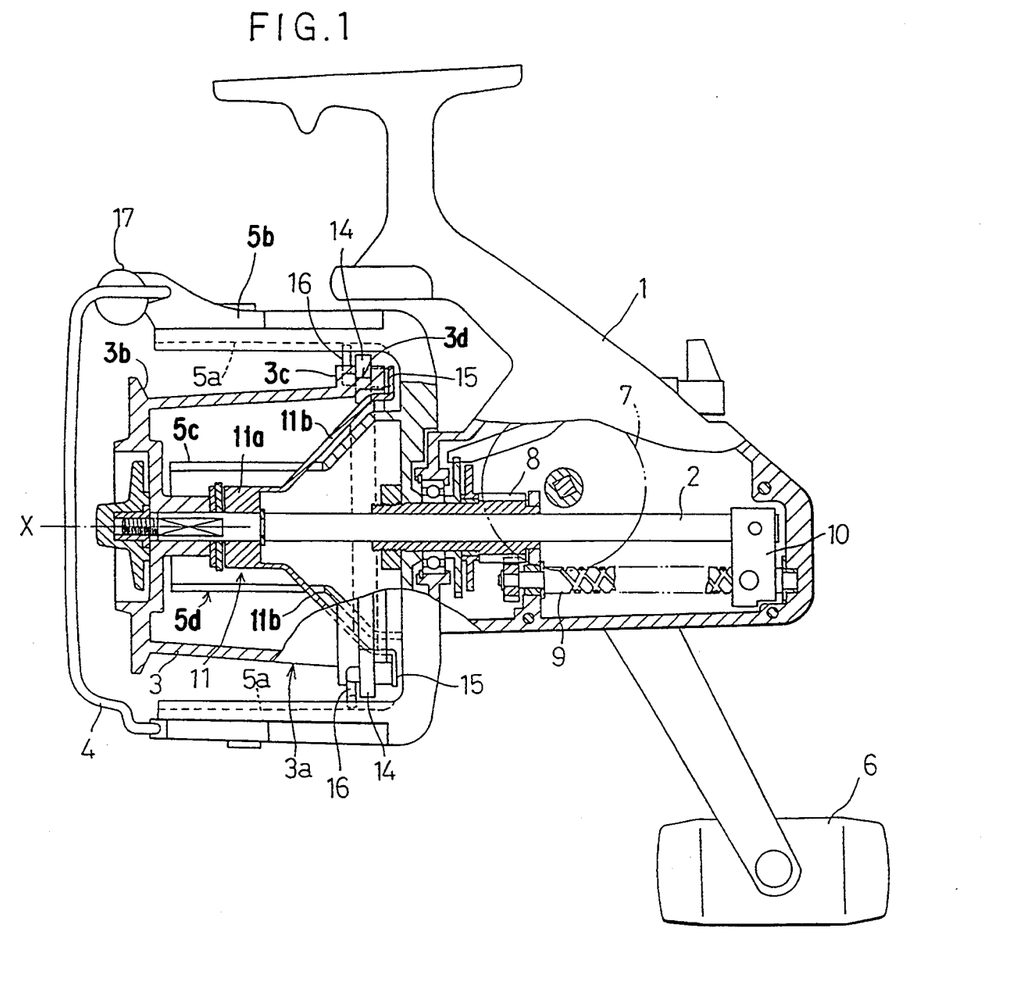
FIG. 1 is an overall side view in vertical section showing a spinning reel of one embodiment of the invention.
Figure 2:
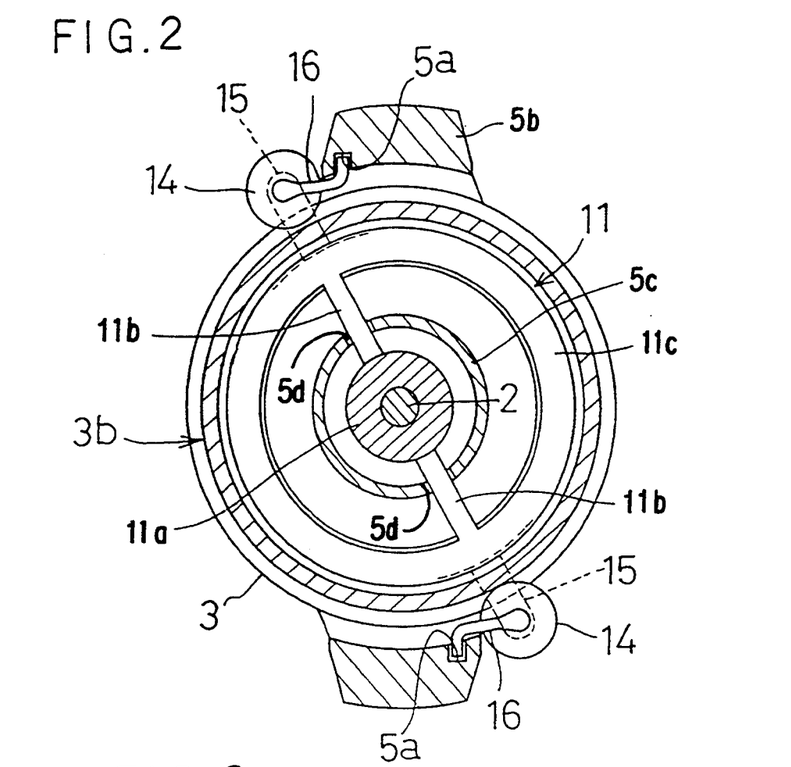
FIG. 2 is a front view in vertical section of the reel of FIG. 1.

A support shaft 2 extending from a front portion of a reel body 1 mounts a spool 3 for winding a fishing line thereabout. Further, a rotary frame 5 carrying a line roller 17 for winding the line about the spool 3 and a bail arm 4 is rotatably fitted on the support shaft 2, with the frame 5 being rotatable about an axis X of the shaft 2. For driving this rotary frame 5, the reel body 1 accommodates a master gear 7 driven by a handle 6 and a pinion gear 8 meshable with the master gear 7 to receive power therefrom to drive the rotary frame 5. A spiral-grooved shaft 9 and a slider 10 for receiving a part of the power from the pinion gear 8 to axially reciprocate the support shaft 2 are provided as a spool driving unit for moving the support shaft 2 and the spool 3 together along the axis of the support shaft 2.

The spool 3 forms, in its outer periphery, a line-accommodating portion 3a bound between front and rear annular portions 3b, 3c such that the line roller 17 rotatable in unison with the rotary frame 5 winds the line about this line-accommodating portion 3a and further that the reciprocating motion of the spool 3 in association with the rotation of the rotary frame 5 levels the winding of the line.

Next, a line-retainer means 11 for retaining the line falling off the rear annular wall 3c of the line-accommodating portion 3a will be described.

Figure 3:
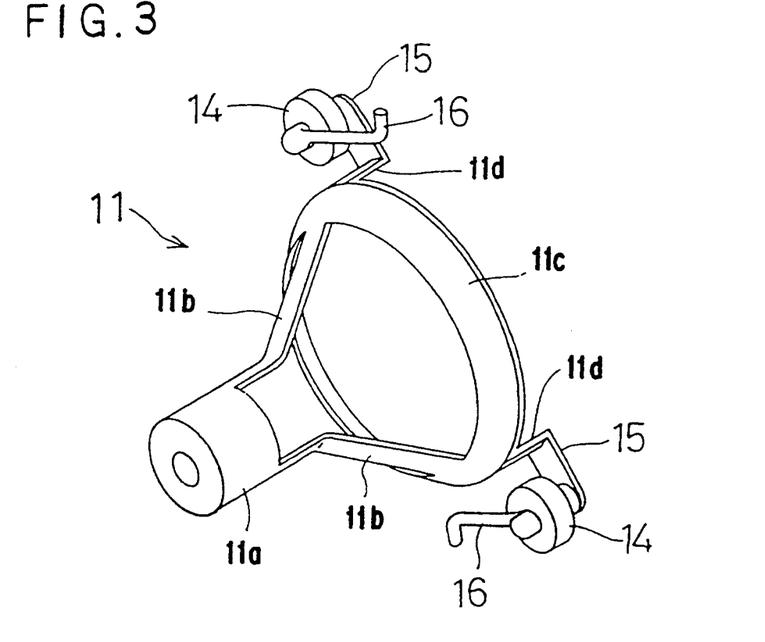
FIG. 3 is a perspective view showing a line-retainer means used in the reel.

As shown in FIGS. 1 and 3, this line-retainer means 11 includes a base-end boss portion 11a fitted on the support shaft 2 to be rotatable and movable with the shaft 2, an annular frame member 11c and a pair of connecting frame members 11b, 11b for integrally connecting the boss portion 11A with the annular frame member 11c; and the annular frame member 11c forms engaging extensions for engaging the spool 3 and the rotary frame 5.

Next, this engagement construction will be described in particular.

The rear (end) annular wall 3c of the spool 3 defines an annular groove 3b; whereas, a roller 14 is provided as a roller member rotatable as engaging with the annular groove 3d. Further, a support frame 15 supporting the roller 14 is attached to brackets 11d, 11d of the annular frame member 11c. To a leading end of this support frame 15, there is fixedly screwed a substantially 'L'-shaped end frame 16 for engagement with a straight groove 5a defined in the rotary frame 5. More particularly, this straight groove 5a is defined at a bail-arm support arm 5b extending from the body of the rotary frame 5 with 180 degree displacement relative thereto.

Now, the roller 14 and the support frame 15 will be generically referred to as a spool engaging unit for allowing the line-retainer means 11 to move back and forth along and to rotate relative to the spool 3. Also, the annular groove 3d will be referred to as an engaging portion of the spool, hereinafter. Further, the end frame 16 will be referred to as a rotary frame engaging unit for allowing the line-retainer means 11 to rotate with and slide relative to the rotary frame 5. Also, the straight groove 5a will be referred to as an engaging portion of the rotary frame.

Then, as the line-retainer means 11 is attached to the spool shaft 2, the spool engaging unit and the rotary frame engaging unit can be disposed at a gap between the bail-arm support arm 5b and the rear annular wall 3c of the spool, thus effectively preventing falling of the line off the line-accommodating portion 3a and intrusion of the fallen line into the region adjacent the support shaft 2.

At a central region inside the rotary frame 5, there is a projecting cylindrical boss 5B formed along the support shaft 2 and this cylindrical boss defines cutout grooves 5d, 5d along the support shaft 2. Then, when the line-retainer means 11 is attached to the support shaft 2, the connecting frame members 11b, 11b are brought into engagement with the cutout grooves 5d, thus constructing the rotary-frame engaging unit and the engaging portion of the rotary frame for rotating the line-retainer means 11 together with the rotary frame 5.

Some other embodiments of the present invention will be specifically described next.

(a) The roller member can be provided to the rotary-frame engaging unit so as to further smoothe the relative movement between the rotary frame 5 and the line-retainer means 11.

(b) It is not essential for the present invention to support the line-retainer means 11 to the support shaft 2. Instead, this member 11 can be supported to the spool 3, or to any other appropriate component of the reel. Also, various modifications will be obivous for one skilled in the art in the configuration of this line-retainer means 11.

(c) The roller member 14 can be formed spherical rather than cylindrical. Or, a bearing may replace this, as will be described later.

Figure 4:
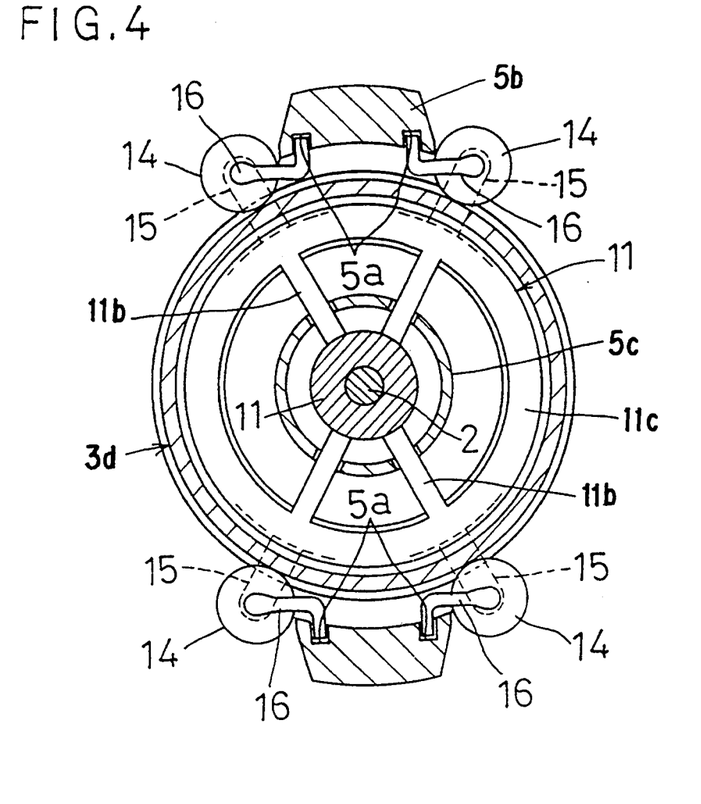
FIG. 4 is a front view in vertical section showing a spinning reel relating to a further embodiment which reel includes four units of roller members.

(d) As shown in FIG. 4, in disposing the roller member 14 of the line-retainer means 11, it is conceivable to provide four units of the roller members 14 as opposed across the bail-arm support arm 5b. This alternate construction will be more effective as being capable of receiving a falling line over a broader region extending across the opposed sides of the bail-arm support arm 5b.

Figure 5:
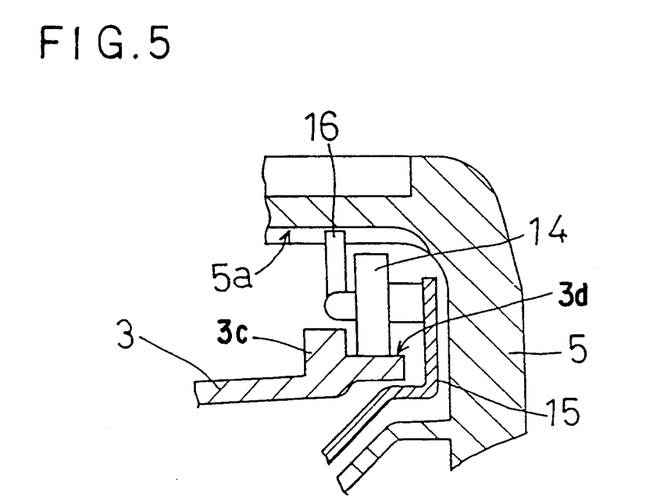
FIG. 5 is a side view of the reel of FIG. 4 which view illustrates an engaging condition of the roller members and a rear annular wall.

(e) The annular groove 3d to be defined in the spool rear annular wall 3c can be formed differently. For instance, as shown in FIG. 5, it is conceivable to eliminate the rear wall defining this annular groove 3d. This construction is advantageous for eliminating the necessity of detaching the line-retainer means 11 from the support shaft 2 together with the spool 3 when only the spool 3 has to be detached from the support shaft 2. Similarly, assembly of the constuction will be facilitated as well.

Further, if the roller member 14 is formed of a soft material, it becomes easier to elastically deform and insert this roller member 14 into the annular groove, 3d without eliminating the rear wall of the annular groove 3d.

(f) In the construction of the line-retainer means 11, it is conceivable to interpose a bearing mechanism between the spool engaging unit and the engaging portion of the spool, such that the unit and the portion become interconnected via the bearing mechanism.

Figure 6:
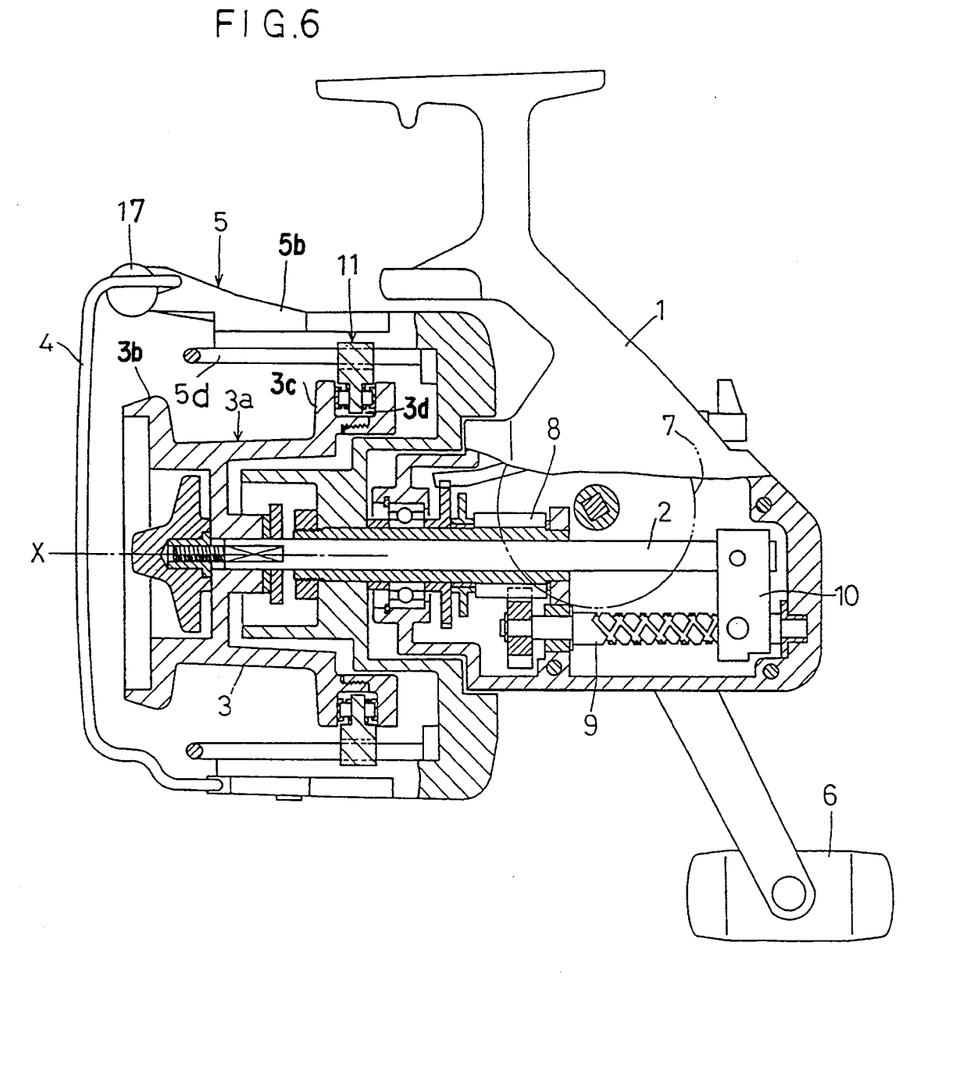
FIG. 6 is an overall side view in vertical section showing a spinning reel relating to a still further embodiment of the invention.
Figure 7:
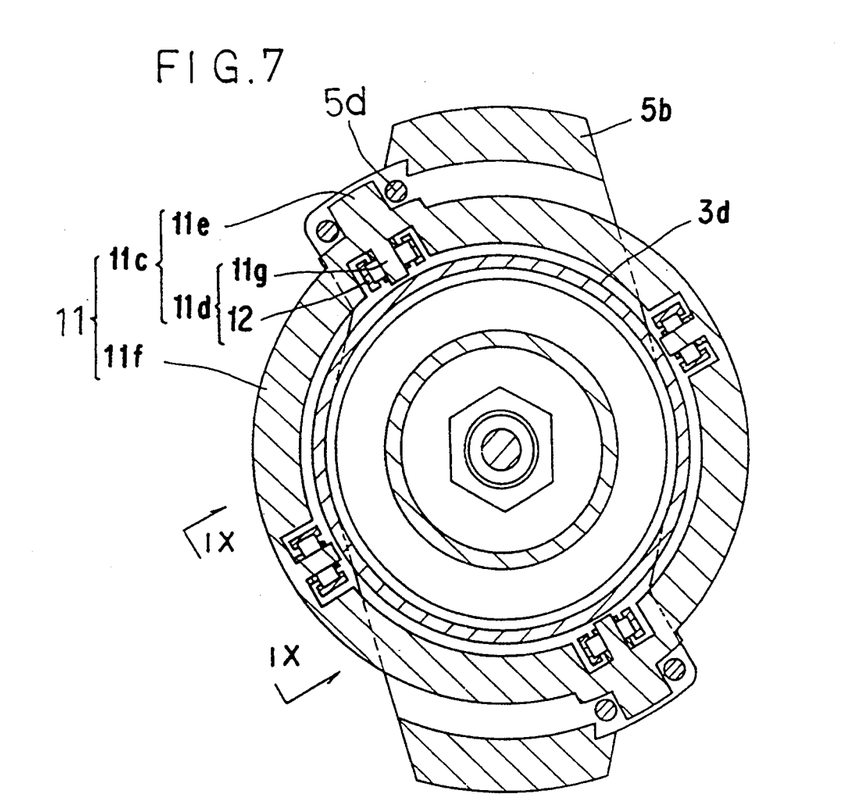
FIG. 7 is a front view in vertical section of FIG. 6.

This alternate embodiment will be more detailed with reference to FIGS. 6 and FIG. 7. FIG. 6 shows an entire spinning reel of this particular embodiment and FIG. 7 shows a modified line-retainer means 11 used in this reel. This line-retainer means 11 includes, at four peripheral positions thereof, a plurality of main engaging elements 11c each consisting of an integral combination of a spool engaging part 11d and a rotary-frame engaging part 11e (these parts 11d and 11e will be detailed later), with the four main engaging elements 11c being interconnected with each other through four arcuate auxiliary elements 11f, thus providing an annular configuration. That is, the spool engaging part 11 is formed as a thickness-wise opened recess defined in an inner peripheral face of the main engaging element 11c. Further, a support shaft 11g is projectingly disposed inside the opened recess and a roller bearing 12 is fitted on this support shaft 11g.

Figures 9, 10:
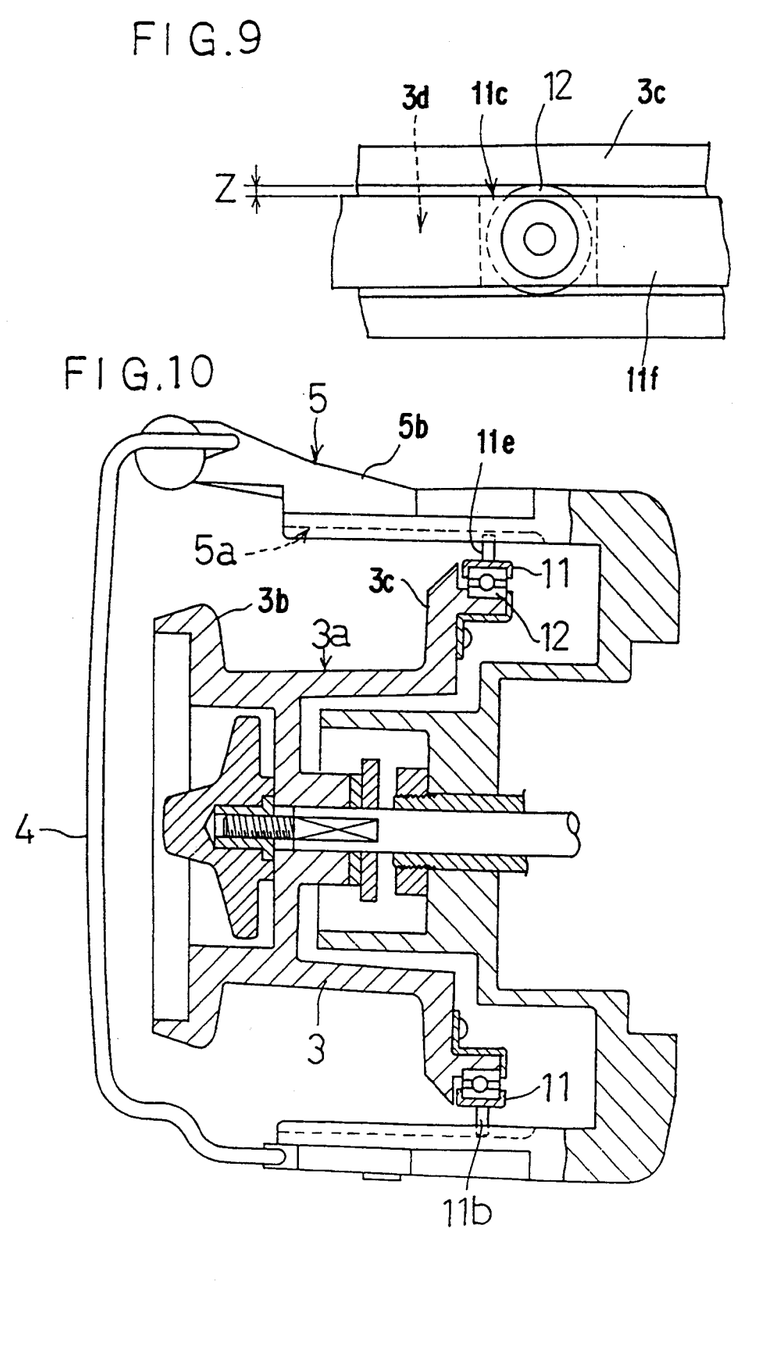
FIG. 9 is a perspective view taken along a line 9—9 in FIG. 7.
FIG. 10 is a side view in vertical section showing a still further embodiment of a line-retainer means.

Moreover, as shown in FIGS. 7 and 9, an annular concave groove 3d, because engaging portion of the spool, is defined in an outer peripheral face of the spool 3. Then, as the roller bearing 12 is positioned within this annular concave groove 3d, the spool engaging element 11d and the engaging portion 3d of the spool are interconnected with each other so as to allow the line-retainer means 11 to reciprocate with the spool 3 and also rotate relative to the spool 3.

Figure 8:
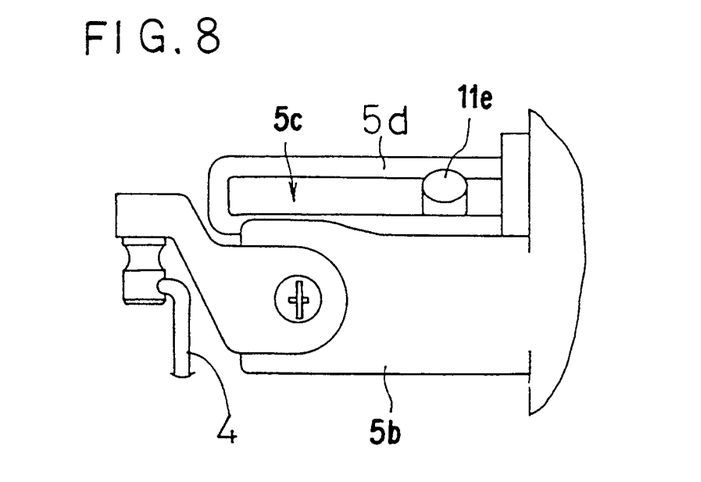
FIG. 8 is a plane view showing a bail-arm support arm.

On the other hand, as shown in FIGS. 7 and 8, the rotary-frame engaging portion 11e is formed as a projecting extension extending radially outwardly from the main engaging element 11c corresponding to the bail-arm support arm 5b of the rotary frame 5. In addition to this, the bail-arm support arm 5b forms, in the longitudinal direction thereof, an engaging portion 5d of the rotary member. This engaging portion 5d is constructed as a ring-shaped rod having a small diameter. And, into an elongated slot 5c formed within the ring-shaped rod, there is held the rotary-frame engaging element 11e. Accordingly, through engagement between this rotary-frame engaging element 11e and the engaging portion 5d of the rotary frame 5, the line-retainer means 11 becomes rotatable with the rotary frame 5 and also reciprocable along the support shaft axis X relative to this rotary frame 5.

With the above-detailed construction, with a line-winding rotation of the handle 6, the line-retainer means 11 and the rotary frame 5 are rotated together with and slidably reciprocated with the spool 3. Therefore, the construction can reliably receive the fishing line which has fallen off the rear end wall 3c and moves along the support arm 5b of the rotary frame 5 towards the support shaft 2. In particular, through the rolling effect of the roller bearing 12 the rotational force required for rotating the rotary frame 5 can be reduced, thus lightening the operational feel for the user and also reducing friction noise generated between the spool 3 and the line-retainer means 11.

On the other hand, as illustrated in FIG. 9, by rendering an interval Z between the front face of the main engaging element 11c and the arcuate auxiliary part 11d smaller than a diameter of the fishing line, the construction can reliably prevent falling of the line into the annular concave groove 3d.

As described above, through the provision of the roller 12 where the relative rotation takes place between the spool engaging unit and the engaging portion of the spool, it has become possible to further smooth the relative rotation between the engaging unit and the engaging portion. Moreover, the roller 12 enables the integral movement of the spool and the line-retainer means along the axis of the support shaft, without requiring any other special mechanism therefor.

As a result, the construction can reduce the frictional resistance between the spool engaging unit and the engaging portion of the spool, thereby reducing the rotation force required for rotating the rotary frame and without impairing the compactness of the entire reel of a manual drive type or an electric motor drive type.

Figure 11:
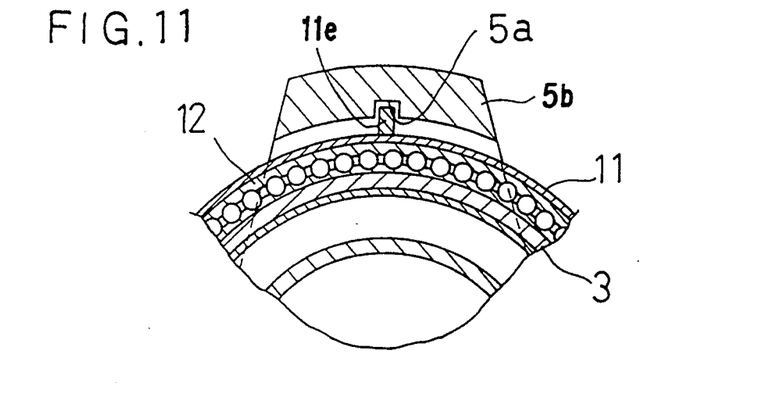
FIG. 11 is front view showing a still further embodiment of a line-retainer means and a bearing of FIG. 10.

(g) A still alternate construction of the line-retainer means 11 will be described. As shown in FIGS. 10 and 11, a large-diameter ball bearing 12' is fitted within and held along an annular concave groove defined in the rear annular wall 3c of the spool 3. Further, projecting elements are attached to an outer race of this ball bearing 12' with 180 degree displacement therebetween. Then, these projecting elements comprise the line-retainer means 11 in this construction. More particularly, a narrow free end of each projecting element 11, as a rotary-frame engaging element 11e, is brought into engagement with the engaging groove 5a defined in the support arm 5b, with the groove 5a acting as the engaging portion of the rotary frame, such that the line-retainer means 11 becomes rotatable in unison with and slidingly reciprocable relative to the rotary frame 5. Further, this construction too permits smooth relative rotation between the line-retainer means 11 and the spool 3 and smooth reciprocating union action of these along the axis of the support shaft.

Figure 12:
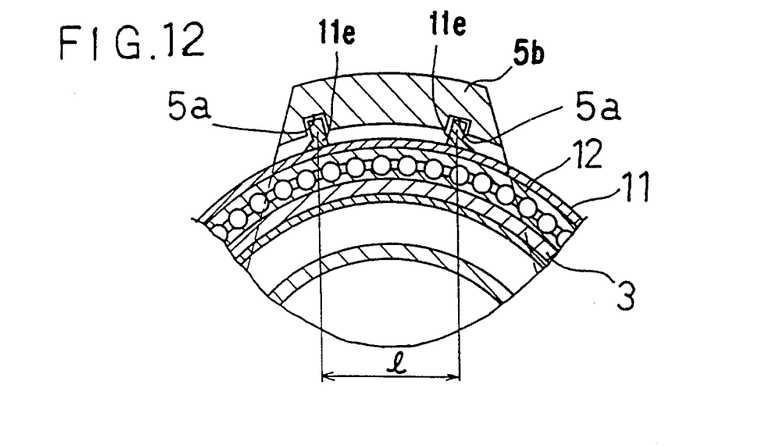
FIG. 12 is a front view showing a still further embodiment of a line-retainer means of FIG. 10.

(h) A still modified construction of the line-retainer means 11 is shown in FIG. 12. In this modified construction, the retainer means 11 includes four projecting elements 11e, i.e. two pairs of 180 degree opposed elements 11e, 11; whereas, the corresponding two engaging grooves 5a are defined in the support arm 5b. In this case, the peripherally adjacent pairs of the projecting elements 11e can further effectively receive a falling line. Moreover, with an increase in an interval 1 between the peripherally adjacent elements 11, 11, it becomes possible to flip away the falling line towards the line-accommodating portion through rotation of the projecting elements 11e.

(i) A slide bearing such as a bush can be used in place of the roller bearing 12 including the above-described ball bearing. Further, it is also conceivable to loosely fit a cylindrical element on the support shaft 11c, such that free rotation of this cylindrical element serves to reduce frictional resistance.

Figure 13:
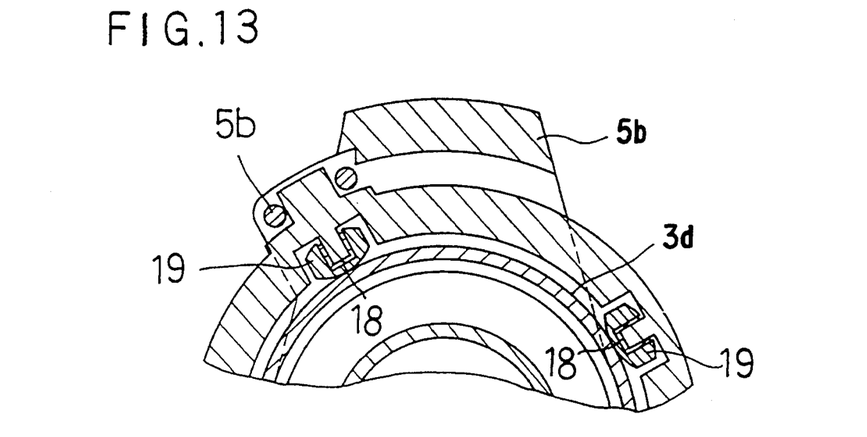
FIG. 13 is an enlarged view showing major portions of a bearing mechanism according to a still further embodiment of the invention.

(j) As shown in FIG. 13, in constructing the bearing mechanism, it is conceivable to loosely but unwithdrawably fit a collar 18 formed of a resin material on the support shaft 11e while fitting a roller member 19, formed of a soft material capable of reducing noise generation such as a soft rubber, on the periphery of this collar 19, so that the roller rotates and moves along the annular concave groove 3c with rotation of the rotary frame 5.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A spinning reel comprising:

a rotary frame rotatable about an axis, said rotary frame including a bail arm and a support arm for supporting said bail arm, said rotary frame having an engaging portion;

a support shaft reciprocating along said axis in accordance with rotation of said rotary frame, said support shaft having an end;

a spool fixed to said end of said support shaft, said spool reciprocating with said support shaft, said spool having an engaging portion;

a line-retainer means for closing a gap between said rotary frame and said spool, said line-retainer means including:

a base-end boss portion fitted on said support shaft, said base-end boss portion being rotatable with respect to said support shaft, said base-end boss portion being axially movable with said support shaft;

an annular frame member;

a connecting frame member for integrally connecting said base-end boss portion to said annular frame member;

a support frame extending outwardly from said annular frame member;

first spool engaging means disposed at a side of an outer periphery of said spool, said first spool engaging means having an axis substantially parallel to said axis of said rotary frame and having a roller member rotatably mounted on said support frame and engageable with said engaging portion of said spool to reciprocate with said spool and also to rotate relative to said spool; and a rotary frame engaging means extending from said support frame, said rotary frame engaging means being engageable with said engaging portion of said rotary frame at a position adjacent to said roller member so as to rotate with said rotary frame and also to reciprocate relative to said rotary frame.

2. A spinning reel as defined in claim 1 wherein said spool has a rear end wall, and an annular groove, said annular groove being located in said rear end wall of said spool, and wherein said roller member is engageable with said annular groove.

3. A spinning reel as defined in claim 2 wherein said roller member is rotatable relative to said spool by friction against an outer periphery of said annular groove.

4. A spinning reel as defined in claim 2 wherein said engaging portion of said rotary frame is a groove extending axially of said support shaft, and said rotary frame engaging means includes an engaging portion having an end connected to said support shaft and another end engaged with said groove of said rotary frame.

5. A spinning reel as defined in claim 4 wherein said engaging portion of said rotary frame engaging means has a substantially 'L'-shaped configuration and is fixedly screwed to said support frame.

6. A spinning reel as defined in claim 2 wherein said annular groove has a stepped configuration.

7. A spinning reel as defined in claim 1, further comprising second, third and fourth spool engaging means each having a roller member engageable with said engaging portion of said spool to reciprocate with said spool and also to rotate relative to said spool, said first and second engaging means forming a first pair of engaging means, said third and fourth engaging means forming a second pair of engaging means, and wherein said support shaft is located between said first pair of engaging means and said second pair of engaging means.

* * * * *